(12) United States Patent
King

(10) Patent No.: US 6,208,305 B1
(45) Date of Patent: Mar. 27, 2001

(54) INTEGRATED ANTENNA AND TRIM COMPONENT FOR AN AUTOMOTIVE VEHICLE

(75) Inventor: Joseph D. King, Hudson, NH (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 09/373,692

(22) Filed: Aug. 13, 1999

Related U.S. Application Data

(63) Continuation-in-part of application No. 09/098,085, filed on Jun. 16, 1998.

(51) Int. Cl.⁷ ........................................ H01Q 1/32
(52) U.S. Cl. ............................... 343/713; 343/711
(58) Field of Search ........................ 343/713, 711, 343/700 MS, 712; H01Q 1/32

(56) References Cited

U.S. PATENT DOCUMENTS

| | | |
|---|---|---|
| 3,740,567 | 6/1973 | Atkins . |
| 3,896,448 * | 7/1975 | Killen et al. ..................... 343/713 |
| 4,559,868 | 12/1985 | Nonaka et al. . |
| 4,768,037 | 8/1988 | Inaba et al. . |
| 4,811,024 | 3/1989 | Ohe et al. . |
| 5,177,494 | 1/1993 | Dorris et al. . |
| 5,324,374 | 6/1994 | Harmand et al. . |
| 5,596,316 * | 1/1997 | Honeck ........................... 343/713 |
| 5,610,618 * | 3/1997 | Adrian et al. .................... 343/713 |
| 5,627,903 | 5/1997 | Porrazzo et al. . |
| 5,649,316 | 7/1997 | Prudhomme et al. . |
| 5,682,168 * | 10/1997 | James et al. ..................... 343/713 |
| 5,867,093 * | 2/1999 | Dodd et al. ...................... 343/713 |
| 6,011,518 * | 1/2000 | Yamagishi et al. ............... 343/713 |

FOREIGN PATENT DOCUMENTS

| | | |
|---|---|---|
| 0 358 308 A1 | 3/1990 | (EP) . |
| 07131223 | 5/1995 | (EP) . |
| 08268227 | 10/1996 | (EP) . |
| 0 786 379 A2 | 1/1997 | (EP) . |
| 7-131223 | 5/1995 | (JP) . |
| 8-268227 | 10/1996 | (JP) . |
| 98/52786 | 5/1998 | (WO) . |
| 99/65736 | 6/1999 | (WO) . |

* cited by examiner

*Primary Examiner*—Don Wong
*Assistant Examiner*—Hoang Nguyen
(74) *Attorney, Agent, or Firm*—Brooks & Kushman P.C.

(57) ABSTRACT

A vehicle antenna mounted on the surface of a molded interior trim part. The trim part is positioned above a windowsill level in the vehicle passenger compartment, the position of the antenna being in straight-line orientation with respect to a signal-generating device, such as a transmitter for a remote entry system. The strategic location of the antenna with respect to the trim part permits antennas of any suitable size, including a relatively large antenna, whereby sensitivity of the antenna is improved.

17 Claims, 2 Drawing Sheets

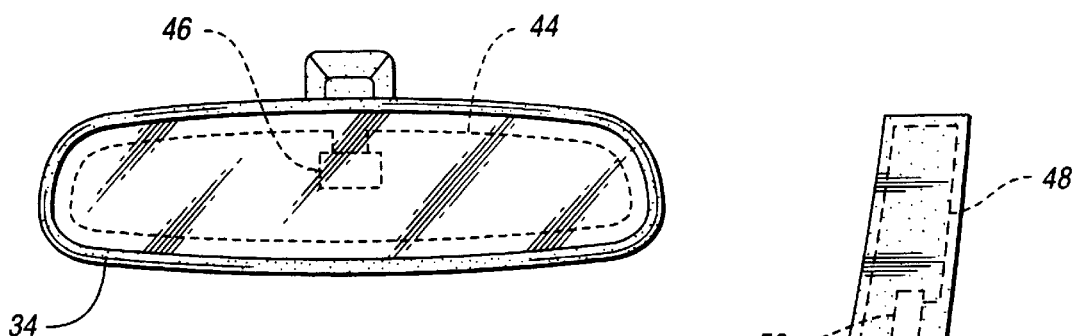
Fig. 3
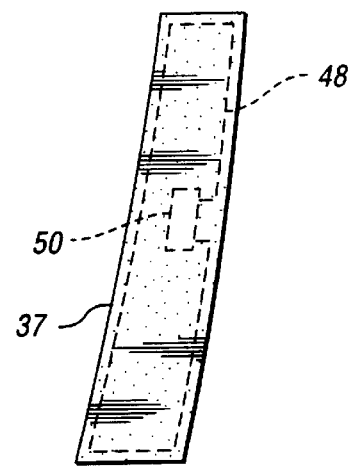
Fig. 4
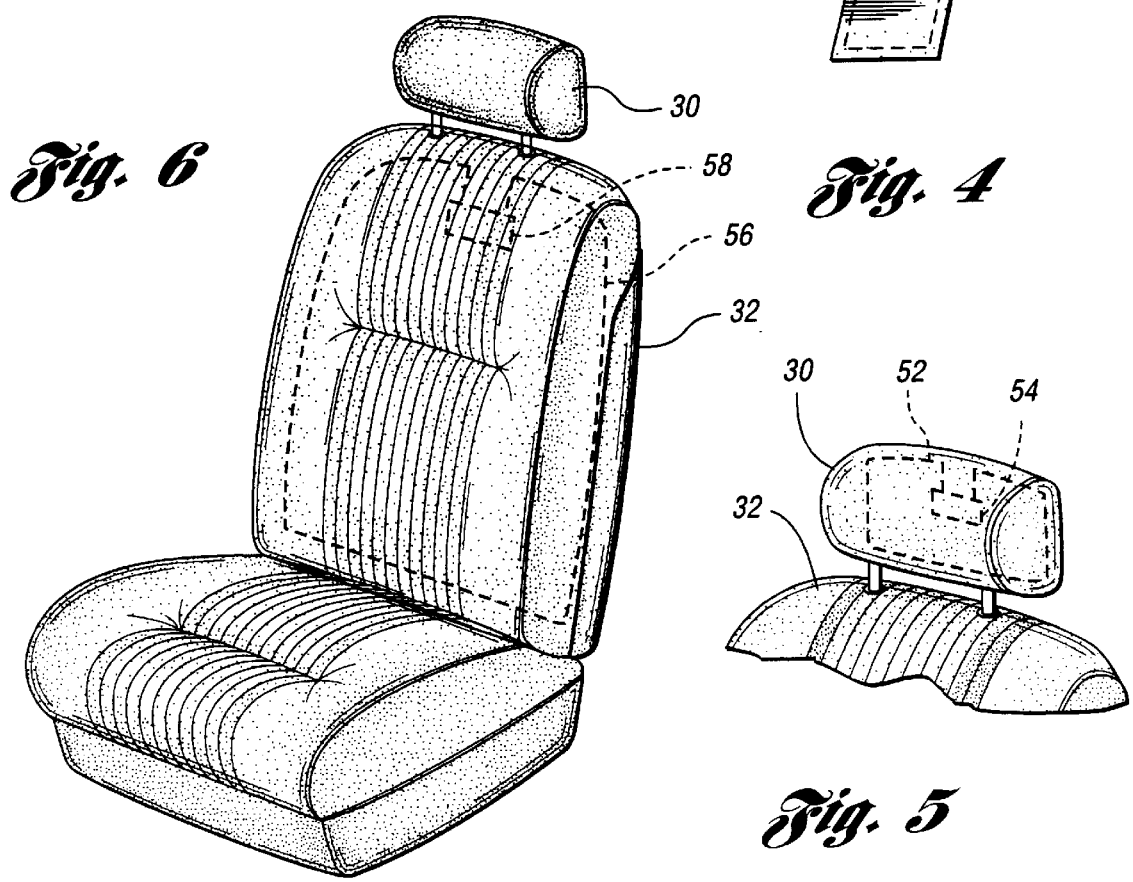
Fig. 6
Fig. 5
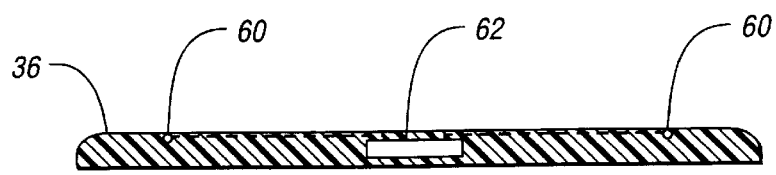
Fig. 7

INTEGRATED ANTENNA AND TRIM COMPONENT FOR AN AUTOMOTIVE VEHICLE

CROSS-REFERENCE TO RELATED APPLICATIONS

This application is a continuation-in-part of U.S. application Ser. No. 09/098,085, filed Jun. 16, 1998.

TECHNICAL FIELD

The invention comprises an antenna capable of being located in a variety of locations within a vehicle passenger compartment wherein the antenna itself is integrated with respect to a vehicle trim component.

BACKGROUND ART

Most modern vehicles are equipped with electronic devices such as a keyless remote entry system, transmitters for garage door openers, radios, position navigation systems, etc., each of which requires an antenna system. Such antenna systems in known automotive applications require compromise in the size of the antenna because of space considerations. The effectiveness of the device that utilizes the antenna is decreased when space restrictions limit the size of the antenna. Further, an automotive vehicle body typically has metal at or near the locations of the antenna, which reduces the effectiveness of the antenna. Because of the space restrictions, transmitters that are used to supply radio frequency signals received by the antenna, such as a remote keyless entry transmitter signal, must be relatively large in size and expensive to manufacture because of the need for the transmitter to provide a powerful radio frequency signal. Similarly, receivers with normal power that are associated with antenna systems of reduced size heretofore have not been able to receive a signal until the transmitter is moved very close to the vehicle.

It would be desirable to eliminate or to reduce these restrictions on the transmitter. Prior art devices, however, do not permit the use of a high efficiency antenna that would make it possible to reduce the transmitter signal power. A relatively large antenna in known antenna systems, furthermore, would not be practical from a commercial standpoint because of aesthetic considerations and because of space limitations on integrating the antenna with passenger compartment components. Space limitations are imposed on the antenna system also by the proximity of structural metal in the passenger compartment.

DISCLOSURE OF INVENTION

The antenna system of the invention integrates an antenna with a vehicle trim component within the vehicle passenger compartment. The transmitter used with the antenna system need not be used with enhanced power because the antenna itself can be relatively large. Further, the signal can be detected by a receiver from a relatively long distance.

At least a portion of the antenna system is positioned on a vehicle interior trim component in the passenger compartment at a location vertically above the sill of a window for the vehicle. In this way, a transmitter, such as a remote entry transmitter, pointed at the vehicle will provide a signal to the antenna in an unobstructed line-of-sight fashion. The antenna may be applied to a vehicle trim element, such as a steering wheel cover or within a headrest of a vehicle, or within the vertical seat back of the driver seat or passenger seat, or within the rearview mirror, or within the rear deck of the vehicle, or as part of the pillar trim in the passenger compartment.

According to a preferred embodiment of the invention, the antenna is formed as a near-transparent film that contains indium-tin oxide. The film can be applied to the surface of a trim component using known techniques. This material is known commercially as indium-tin oxide #49. It can be deposited on the surface of a vehicle trim component using, for example, a vacuum depositing method, or electrostatic depositing method, or a sputtering method. Because of the near transparency of the film, the aesthetics of the trim material remain unchanged. The indium-tin oxide is electrically conductive and, following its application to the surface of a trim component, provides an efficient antenna system of substantial length.

An alternate embodiment of the invention may use a pinstripe, electrically conductive material formed on the outer surface of a vehicle trim component. In this instance, the pinstripe may form a part of the trim design to add to the aesthetics.

Although indium-tin oxide material has a higher resistivity compared to copper or other efficient electrically conducive materials, compensation for this feature is provided by the increased length of the antenna made possible by the use of this technique for forming the antenna.

If the vehicle antenna is used with a transponder for an engine starter, the antenna must be located within two centimeters of the transponder in order to be effective. This design limitation can be avoided by using a relatively large antenna incorporating the features of the invention. A 125 kHz signal, for example, would have a long wavelength and, of necessity, would require a long antenna. Such a long antenna can be achieved by using the antenna of the invention where the length is increased without affecting the aesthetics of the trim and without being affected by space limitations imposed on conventional antenna systems.

A receiver or transmitter for conventional systems may experience signal losses at the frequencies of interest unless the receiver is located near the antenna. The receiver or transmitter can be located farther from the electronic unit because of the increased length of the antenna that is made possible by the invention. It is not necessary, for example, to use a transmitter with enhanced wattage if it is capable of functioning with a useful signal of low wattage because of the presence of a large antenna.

Trim materials typically used in automotive vehicle passenger compartments often contain dies that have a carbon content. By using the antenna system of the invention where the antenna wire is applied to the surface of the trim, the presence of the carbon in the trim itself will not attenuate the signal for the antenna. This would not be possible if the antenna is located within the trim itself.

BRIEF DESCRIPTION OF DRAWINGS

FIG. 3 is a third embodiment of the present invention;

FIG. 4 is a fourth embodiment of the present invention;

FIG. 5 is a fifth embodiment of the present invention;

FIG. 6 is a sixth embodiment of the present invention; and

FIG. 7 is a seventh embodiment of the present invention.

BEST MODE FOR CARRYING OUT THE INVENTION

Figure 1A:
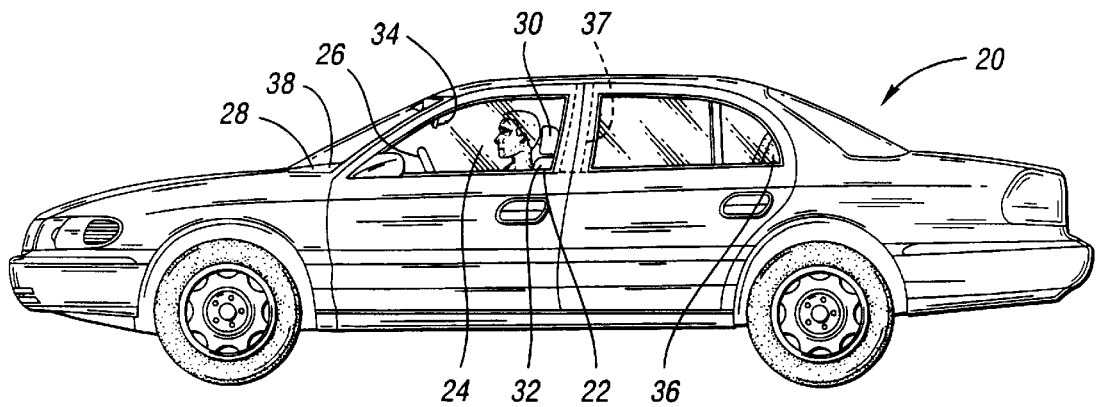
FIG. 1a is a schematic view of a vehicle incorporating a first embodiment of the present invention.

FIG. 1 shows a vehicle 20 having a belt line or windowsill level 22. A passenger compartment or cab area 24 is defined for purposes of this invention within the windows and above the sill level 22. Steering wheel 26 extends above the sill level 22, as does the instrument panel 28, the headrest 30 and seat 32. The rearview mirror 34 and the rear deck 36 are also above level 22. Further, a pillar trim piece 37 extending between the roof of the vehicle and the level 22 at one side of the vehicle also is visible within the cab through the windows.

Figure 1B:
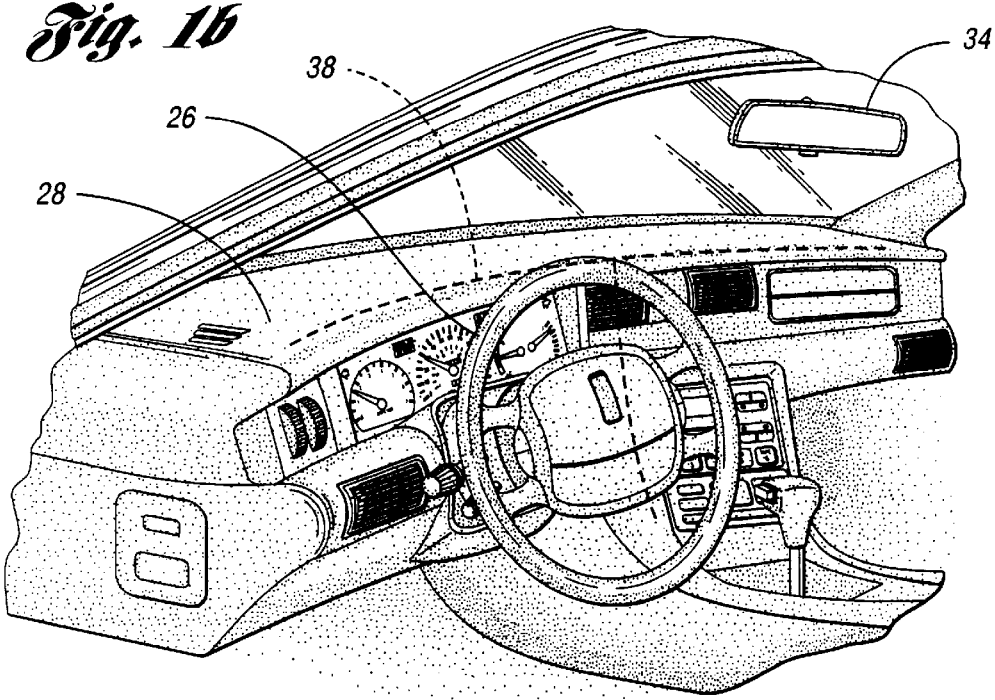
FIG. 1b is a front view of the first embodiment.

In FIG. 1a, an antenna 38 is shown schematically. It is applied to the surface of the instrument panel 28. As shown in FIG. 1b, the antenna can extend for a relatively long distance on the instrument panel. The antenna is positioned above the sill level 22. Should an operator point a transmitter at the vehicle, the signal is not obstructed (e.g., reflected, shielded) by the metal, but will be easily received by the antenna 38. The antenna may be a dipole if that meets the design requirements of the system.

Although the antenna is shown in part generally within the instrument panel, its should be understood that the antenna could be associated with a component of the instrument panel. As an example, a part of the antenna could be positioned within the vent opening for the defroster, or some other component.

The antenna may be applied to the instrument panel on the surface level, and thus will be of a relatively great size without further restricting other components of the vehicle.

Figure 2:
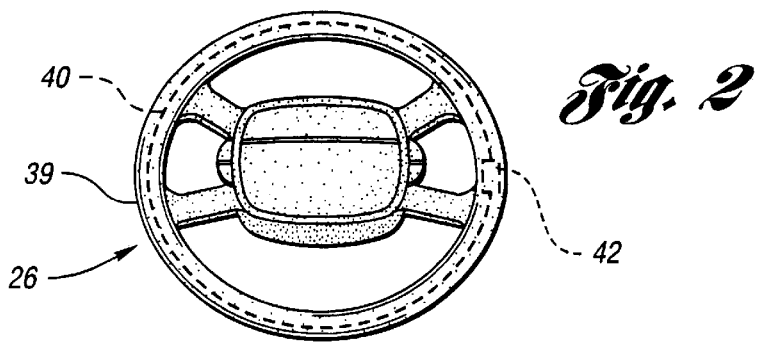
FIG. 2 is a second embodiment of the present invention.

FIG. 2 shows an alternative embodiment wherein the steering wheel 26 has a rim 39 to which antenna 40 is applied on its surface, forming a loop antenna. Although a steering wheel is not typically called an interior trim member, for purposes of this description it will be broadly described as such. The antenna 40 communicates with an electronic device, such as the receiver 42 for a remote entry system that may or may not be part of the trim component. The receiver 42 may communicate electrically with a control for opening the vehicle door locks, etc., as known. Further, the device 42 may simply be installed remotely from the trim component, and the antenna may be directly connected to receiver 42 through an appropriate transmission line.

FIG. 3 shows the vehicle rear view mirror 34 receiving the antenna 44 on a rear surface. Again, the receiver 46 may be connected to the antenna 44, and may be placed within the mirror. Alternatively, receiver 46 may be installed in a location other than the mirror and connected to the antenna 44 by a transmission line.

FIG. 4 shows a column or pillar 37 incorporating an antenna 48. Again it communicates with a receiver, as shown at 50. The generally vertical orientation of the pillar 37 is a desirable orientation for receiving an RF signal emanating in a line-of-sight that is generally horizontal. The antenna 48, as well as the other embodiments, act as electronic dipoles. The steering wheel antenna 40 of FIG. 2, however, may be adapted particularly as a loop antenna.

FIG. 5 shows the headrest 30, having an antenna 52 communicating with a receiver 54.

FIG. 6 shows a seat 32 with the antenna 56 supported on its rear surface, or alternatively on its top surface, and communicating with receiver 58.

FIG. 7 is a side sectional view of the rear deck panel 36. It shows the antenna 60 extending horizontally and communicating with a receiver 62.

In all of the embodiments of the invention, the antenna is mounted on a trim member. In this way, the trim member is able to support a relatively large antenna. The antenna is arranged to receive a signal from a remote entry transmitter, a radio signal, etc., since at least a portion of the antenna is positioned above the windowsill level 22 in the vehicle cab 24.

While the antenna is shown attached to the trim member as part of the trim member, the antenna could be simply attached to the trim member as an electrically conductive pinstripe after it has been formed.

The electronics of this invention are shown somewhat schematically. The receivers would communicate with appropriate devices on the vehicle. This aspect of the invention is as known.

Trim material for contemporary vehicles often include dyes that have a carbon content. The location of the antenna on the surface of the trim member avoids attenuation of the RF signal that otherwise would be caused by the carbon.

The antenna may be applied as a near-transparent, electrically conductive film to the surface of the trim. In this way, the antenna will not detract from the aesthetic quality of the trim. The film may be of an indium-tin oxide constituency and thus will not be visible on the trim surface.

The techniques used to apply the conductive film to the surface of the trim may include vacuum or electrostatic deposition, evaporative deposition or sputtering. Each of these techniques has been used in known methods for applying coatings to a variety of materials, both metallic and nonmetallic.

The indium-tin oxide film (ITO coating) may have a resistivity of about 4–5 ohms per square. ITO coatings often are used, for example, as EMI suppressors on the inside surface of a cathode ray tube (CRT), but the resistivity of such known coatings is much higher (e.g., 10–15 ohms per square and higher). The light transmissibility of such CRT coatings is low compared to the higher light transmissibility of the film of the present invention. In one embodiment of the invention, the transparency is as high as 97 percent for a film having a resistivity of about 5 ohms per square.

The film may be applied to the surface of the trim by a vacuum depositing method. This technique is carried out commercially for EMI suppressors for CRT applications, for example, by Thin Film Technologies, Inc. of Buellton, Calif., and Technet, Inc. of New Jersey.

The thickness of the film of the present invention may be about 2000 angstrom units.

While preferred embodiments have been disclosed, obvious modifications would come within the scope of this invention. A person of ordinary skill in the art would recognize these modifications. For that reason, the following claims determine the true scope and content of the invention.

What is claimed is:

1. An antenna system for an automobile passenger compartment, nonmetallic trim members covering metallic portions of the passenger compartment and window openings in the passenger compartment above a generally horizontal belt line for the passenger compartment;

an electronic circuit means responsive to an RF signal and connected electrically to the antenna system for energizing an RF output driver circuit;

the antenna system comprising an electrically conductive wire defined by a generally transparent film that includes indium-tin oxide;

the film being applied to an outer surface of a nonmetallic trim member whereby an RF signal for the antenna system is not attenuated by constituent elements of the trim members;

the electrically conductive wire being located above the belt line whereby the RF signal for the antenna system is transmitted through the window openings without reflection or shielding by the metallic portions of the passenger compartment.

2. An antenna system as set forth in claim 1 wherein the electronic circuit means is a remote keyless entry mechanism in electrical communication with the RF output driver circuit, the electrically conductive wire of the antenna system being in the effective line of sight of the RF signal.

3. The antenna system as set forth in claim 2 wherein the passenger compartment comprises a vehicle dash with an upper surface located in close proximity to one of the window openings whereby an RF signal for the antenna system is received by the electrically conductive wire without shielding by the metallic portions of the passenger compartment.

4. The antenna system as set forth in claim 2 wherein the passenger compartment comprises a generally vertical passenger compartment roof support, the roof support being surrounded by the nonmetallic trim member, the electrically conductive wire receiving the RF signal for the antenna system without shielding by the metallic portions of the passenger compartment.

5. The antenna system as set forth in claim 2 wherein the passenger compartment includes a rear deck adjacent a rear window opening, the electrically conductive wire receiving the RF signal for the antenna system without shielding by the metallic openings of the passenger compartment.

6. The antenna system as set forth in claim 2 wherein the passenger compartment includes a seat including a headrest, the seat being covered by the trim member, the electrically conductive wire receiving the RF signal for the antenna system without shielding by the metallic portions of the passenger compartment.

7. The antenna system as set forth in claim 2 wherein the passenger compartment includes a steering wheel, the steering wheel being covered by the trim member, the electrically conductive wire receiving the signal for the antenna system without shielding by the metallic portions of the passenger compartment.

8. The antenna system of claim 7 wherein the electrically conductive wire defines a loop antenna.

9. An antenna system as set forth in claim 1 wherein the electronic circuit means is an RF signal transmitter for a garage door opener mechanism, the electrically conductive wire of the antenna system being in the effective line of sight of the RF signal.

10. The antenna system as set forth in claim 9 wherein the passenger compartment comprises a vehicle dash with an upper surface located in close proximity to one of the window openings whereby an RF signal for the antenna system is transmitted fro the electrically conductive wire without shielding by the metallic portions of the passenger compartment.

11. The antenna system as set forth in claim 9 wherein the passenger compartment comprises a generally vertical passenger compartment roof support, the roof support being surrounded by the nonmetallic trim member, the electrically conductive wire transmitting the RF signal for the antenna system without shielding by the nonmetallic portions of the passenger compartment.

12. The antenna system as set forth in claim 9 wherein the passenger compartment includes a rear deck adjacent a rear window opening, the electrically conductive wire transmitting the RF signal for the antenna system without shielding by the metallic portions of the passenger compartment.

13. The antenna system as set forth in claim 9 wherein the passenger compartment includes a seat including a headrest, the seat being covered by the trim member, the electrically conductive wire transmitting the RF signal without shielding by metallic portions of the passenger compartment.

14. The antenna system as set forth in claim 9 wherein the passenger compartment includes a steering wheel, the steering wheel being covered by the trim member, the electrically conductive wire transmitting RF signals for the antenna system without shielding by the metallic portions of the passenger compartment.

15. The antenna as set forth in claim 14 wherein the electrically conductive wire defines a loop antenna.

16. The antenna system as set forth in claim 1 wherein the film has a resistivity of less than 20 ohms per square and a transparency greater than 90 percent.

17. The antenna system as set forth in claim 16 wherein the thickness of the film is less than about 3000 angstrom units.

* * * * *

UNITED STATES PATENT AND TRADEMARK OFFICE
CERTIFICATE OF CORRECTION

PATENT NO. : 6,208,305 B1
DATED : March 27, 2001
INVENTOR(S) : Joseph D. King

It is certified that error appears in the above-identified patent and that said Letters Patent is hereby corrected as shown below:

Column 5, claim 7,
Line 37, after "receiving the" and before "signal" insert -- RF --.

Column 6, claim 10,
Line 8, "fro" should be -- from --.

Signed and Sealed this

Eleventh Day of December, 2001

*Attest:*

*Attesting Officer*

NICHOLAS P. GODICI
*Acting Director of the United States Patent and Trademark Office*